United States Patent [19]

Feldsted

[11] Patent Number: 4,525,107
[45] Date of Patent: Jun. 25, 1985

[54] BARGE HAVING A PNEUMATIC LOADING AND UNLOADING SYSTEM

[76] Inventor: Robert J. C. Feldsted, 2403 Boyer Ave. East, Seattle, Wash. 98102

[21] Appl. No.: 421,361

[22] Filed: Sep. 22, 1982

[51] Int. Cl.³ .............................................. B65G 53/28
[52] U.S. Cl. ...................................... 406/25; 406/89; 406/109; 406/138
[58] Field of Search .................... 406/12, 19, 23–25, 406/134, 136–138, 109, 117–120, 86, 89–91, 122–124, 139, 140, 145, 146, 151–153, 155, 156, 154, 38, 39, 41, 28, 29, 31–33

[56] References Cited

U.S. PATENT DOCUMENTS

| | | | |
|---|---|---|---|
| 3,352,606 | 11/1967 | Page et al. | 406/138 |
| 3,375,042 | 3/1968 | Ostberg et al. | 406/90 |
| 3,758,163 | 9/1973 | Kalisiak | 406/89 |
| 4,168,864 | 9/1979 | Weeks | 406/23 |

*Primary Examiner*—Andres Kashnikow
*Assistant Examiner*—Daniel R. Edelbrock
*Attorney, Agent, or Firm*—Seed and Berry

[57] ABSTRACT

A barge, including a system for pneumatic unloading of cement or other dry, bulk, powdered material from the barge into a receptacle. The barge includes a barge hull; a plurality of side-by-side hoppers disposed in the hull to receive and store the material; a collector system for each hopper to unload the material from the hopper and convey the material to a vacuum-pressure pneumatic conveyor; and a discharge conduit connected to the discharge outlet of the pneumatic conveyor for conveying the material from the conveyor to the receptacle during the discharge cycle. The collector system has an air-assisted gravity conveyor disposed within each hopper to gather the material in each hopper to a plurality of predetermined longitudinally spaced points within each hopper; a suction nozzle communicating with each hopper at each point to unload the material from the hopper by vacuum suction; and a transporter assembly connected to each nozzle outside the hopper to transport the material within the hull from the nozzle to the pneumatic conveyor. The pneumatic conveyor has a storage vessel and a discharge outlet. The pneumatic conveyor is disposed centrally in the hull between hoppers, is connected with the transporter assembly, and alternately fills its storage vessel with the material during a loading cycle and discharges the material from the storage vessel through the discharge outlet during a discharge cycle. The barge further includes a source of compressed air and a vacuum source in the hull.

25 Claims, 10 Drawing Figures

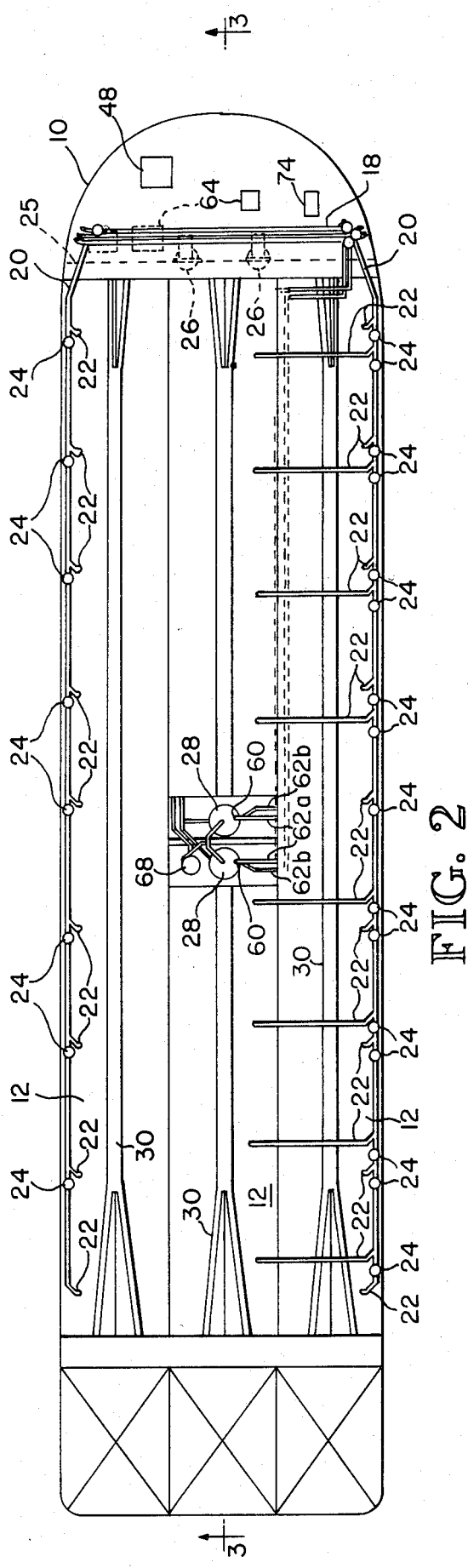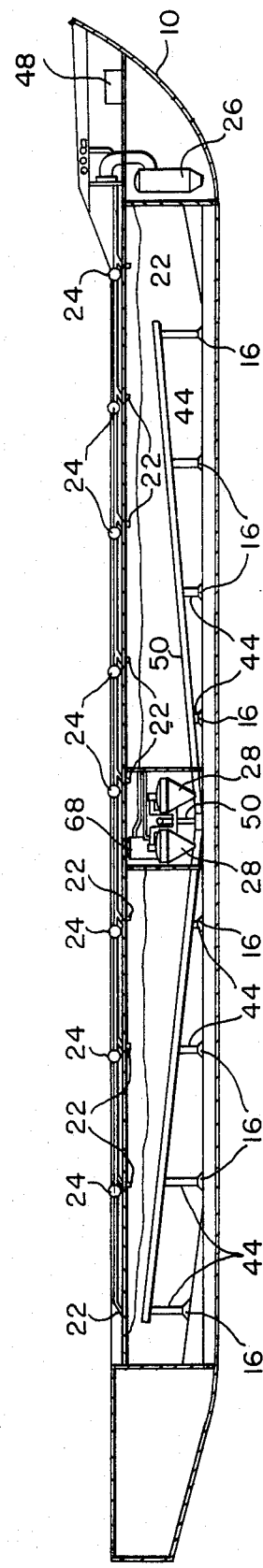
FIG. 2
FIG. 3

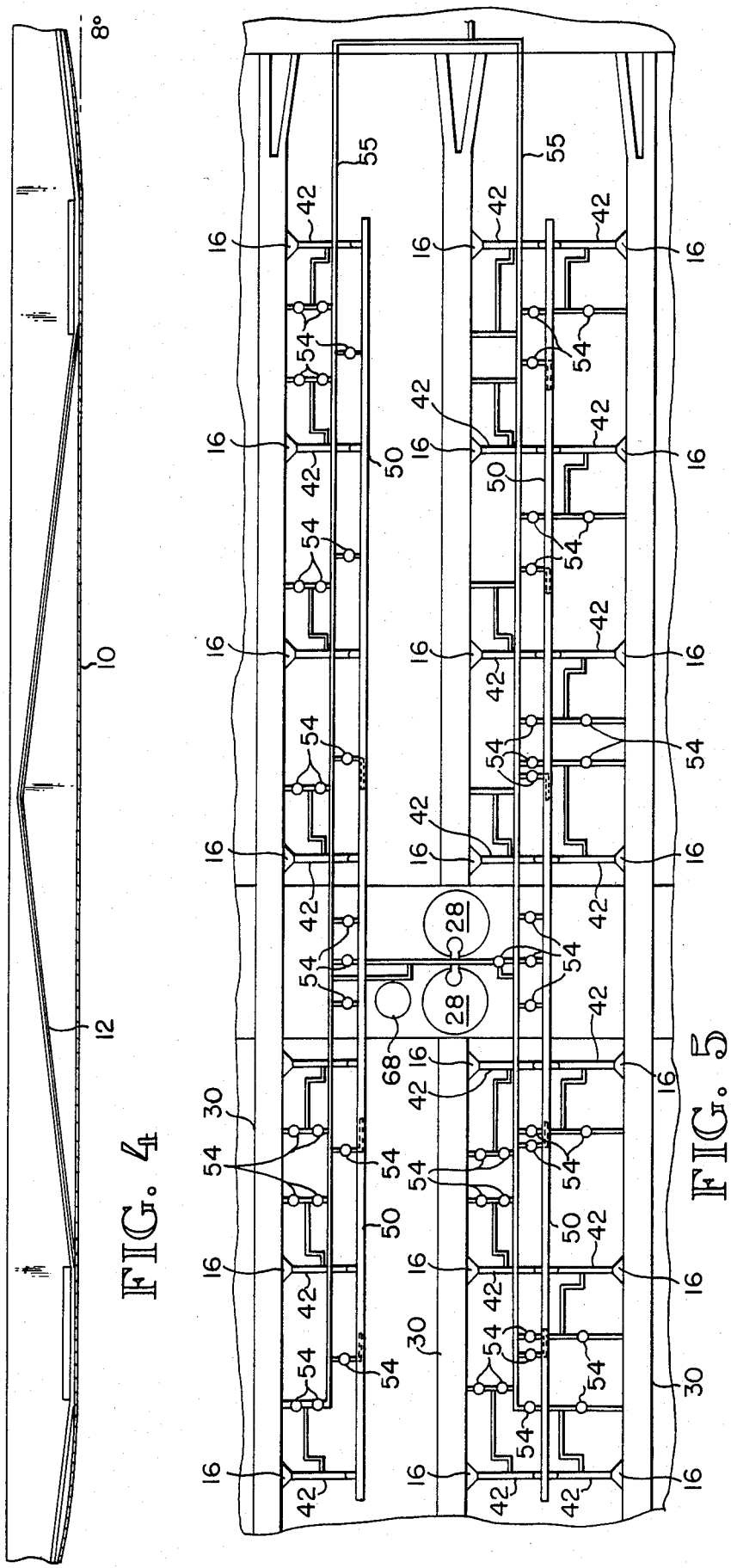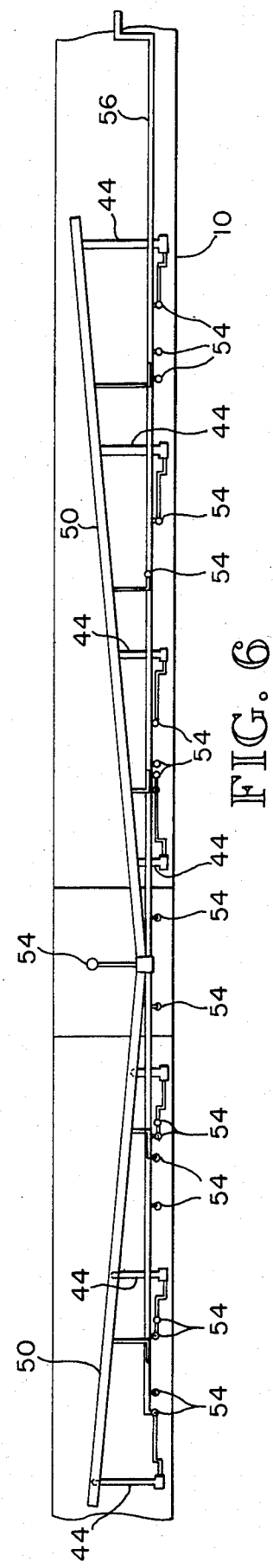

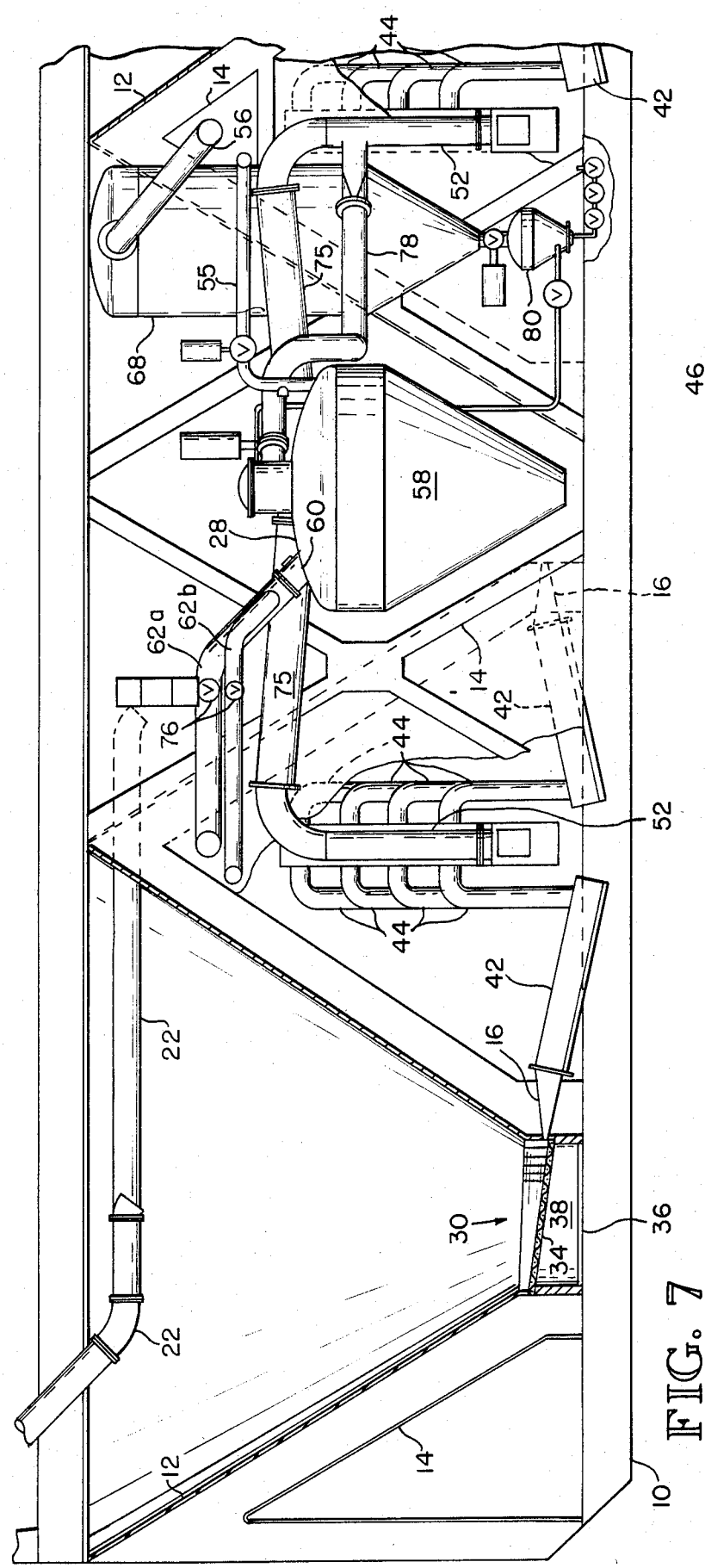
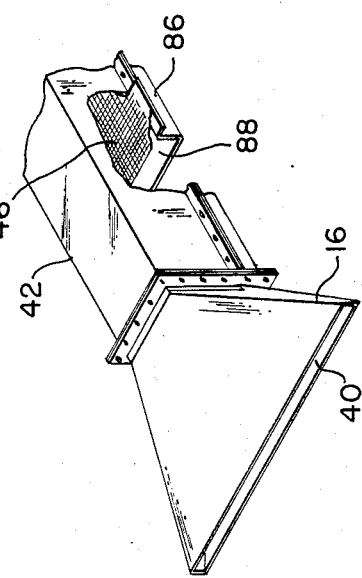
FIG. 7
FIG. 8

BARGE HAVING A PNEUMATIC LOADING AND UNLOADING SYSTEM

TECHNICAL FIELD

The present invention relates to a barge having a pneumatic loading and unloading system for cement and other dry, bulk, powdered, fluidizable materials.

BACKGROUND ART

Cement and other dry, powdered, bulk materials are transported by various means today. For example, often the powdered material is bagged, palletized, and transported in containers on barges. Great expense is incurred in the steps of bagging, placing the bags on pallets, and transporting the pallets because of the relatively small lots of bulk material involved. To overcome this problem, hoppers have been used instead of bags. Both methods are inefficient in utilizing the available storage space within a barge. Therefore, there has been interest in developing barge unloading systems where powdered bulk material is stored in large hoppers built into the hull and is automatically unloaded at the port of entry.

The Fuller-Kinyon "Airslide" barge unloading system ("Airslide" is a registered trademark of Fuller-Kinyon Company) is one such system for unloading cement and other bulk powdered material. As described in Fuller-Kinyon brochure FK-26-D, the unloading system includes a barge having fore and aft holds for the bulk powdered material. "Airslide" pneumatic conveyors are disposed in the bottom of each hold to convey the material to an impeller pump and rotary compressor at the center of the barge, where a plug of the bulk material is pushed into a high-pressure line that conveys the material to onshore storage facilities. The Fuller-Kinyon system is power and capacity inefficient. The impeller pump must be placed below the hold to unload the bulk material and, therefore, wastes some potential storage capacity of the barge.

An alternative pneumatic, self-unloading barge system is disclosed at page 22 of the Halliburton Company brochure entitled "Pneumatic Conveying Systems," SP-11078.

Various components for pneumatic conveying are known. For example, R. Perry and C. Chilton discuss pneumatic conveyors at pages 7-16 through 7-19 of the *Chemical Engineers' Handbook*, Fifth Edition. Halliburton sells "Air Trough" pneumatic fluidizer conveyors ("Air Trough" is a registered trademark of the Halliburton Company). Fuller-Kinyon sells "Airslide" gravity pneumatic conveyors ("Airslide" is a registered trademark of Fuller-Kinyon Company). AirKonvey Company sells vaccuum-pressure pneumatic conveyors, such as the "VACK II" conveyor ("VACK II" is a trademark of Premier Pneumatics, Inc.). Other vacuum-pressure pneumatic conveyors are disclosed in U.S. Pat. Nos. 4,168,864; 3,861,830; and 3,372,958 (incorporated by reference).

DISCLOSURE OF INVENTION

The present invention relates to a pneumatic, self-unloading barge for conveying cement or other dry, bulk, powdered, fluidizable material from hoppers in a barge to an onshore storage vessel. Nozzles draw the material from the hoppers so that a transporter assembly of horizontal pneumatic conveyors and vertical lift tubes can convey the material to at least one central vacuum-pressure pneumatic conveyor, which periodically loads and discharges. During discharge, the vacuum-pressure pneumatic conveyor conveys the bulk material to a predetermined receptacle through discharge conduits.

To reduce dust problems, air recirculation is used by having a closed loop in which air is drawn from the otherwise closed hoppers, cycled through a filtering system, and pressurized to power the several pneumatic (air-assisted gravity) conveyors.

A pneumatic, self-unloading barge system provides numerous advantages over existing systems for conveying bulk materials. In particular, the pneumatic, self-unloading barge system has a long life, has few moving parts (and therefore is reliable and dependable), requires little maintenance, promotes efficient loading and unloading of bulk material, provides balanced loading and unloading, uses the available capacity of a barge more efficiently (i.e., allows greater storage capacity for the bulk material per barge tonnage), is relatively inexpensive, is power efficient, has automatic discharge cycling, controls dust with closed hoppers and air recirculation, is all-pneumatic, and may be easily adapted to modern barge designs to provide a soundly constructed barge wherein the hoppers are part of the trusswork of the barge.

A barge hull has at least one bulk material hopper to hold material. A pneumatic conveyor built into each hopper collects the material to at least one predetermined point where a nozzle draws the material from the hopper. A transporter assembly connects with the nozzle to convey the material from the nozzle to a central vacuum-pressure pneumatic conveyor. The vacuum-pressure pneumatic conveyor, in turn, connects with a discharge conduit which conveys the bulk material to an onshore storage vessel. Ordinarily, the vacuum-pressure pneumatic conveyor automatically cycles between loading and discharging. Preferably, the transporter assembly is fully pneumatic and is powered (at least in part) by a compressor. Pressurized air from the compressor fluidizes the bulk material and conveys it under gravity flow. For horizontal transport of the material, "Airslide"-type conveyors are used. Preferably, phase separation occurs within these conveyors. Phase separation ensures that the flow is slow enough that abrasion and erosion are greatly reduced, and, therefore, means a longer life for the equipment. For vertical transport, vacuum lift tubes are used.

To power the vacuum-pressure pneumatic conveyor requires both a source of compressed air (compressor) and a source of vacuum pressure (vacuum pump). Ordinarily, a vacuum pump is used to pull a vacuum for the vacuum-pressure pneumatic conveyor, although a venturi assembly may be used. Duplex pumps are preferred because they provide both a vacuum and compressed air.

As previously described, the transporter assembly usually includes several horizontal pneumatic conveyors connected with vertical vacuum lift tubes. The vacuum lift tubes are more efficient and more dependable than horizontal pneumatic conveyors of the "Airslide" type. However, pressure losses in supplying a vacuum in long horizontal conduits preclude the use of vacuum conveyors for the entire transport. The vacuum systems are most valuable, then, only for substantially vertical, short line (plug flow) transport of bulk material. Once raised to the desired height, standard, substantially horizontal pneumatic conveyors, such as the "Airslide" conveyor, are used to transport the bulk material the necessary horizontal distances from the hoppers to the vacuum-pressure pneumatic conveyor. With a combination of vacuum lift tubes and pressurized conveyors, smaller pumps may be used, and the costs of the system are subsequently reduced. The preferred vacuum lift tubes are substantially vertical, short-line vacuum lines which convey the bulk material in dense-phase, relatively low-velocity transport. They may be tapered to ensure a constant velocity in each tube. For example, in a sixteen-foot long lift tube, there will be a pressure drop of approximately $7\frac{1}{2}$ psia if Portland cement is lifted at a velocity of between about 25-30 ft/sec (7.6-9.1 m/sec).

The pneumatic, self-unloading barge system of this invention allows for the balanced loading and unloading of a barge by placing nozzles and associated transporter assemblies at various locations about the hoppers and by using associated valves to convey the bulk material from predetermined locations. Balanced loading and unloading is a major improvement over known barge unloading systems. For example, in the Fuller-Kinyon system, the need to use an impeller pump and rotary compressor dictates that the system have a central point which is the lowest hopper height and that the material be unloaded at this central point. Material must be collected toward the central point, dictating that the fore and aft sections of the barge are emptied first.

BRIEF DESCRIPTION OF THE DRAWINGS

FIG. 2 is a top plan view of a preferred barge of this invention.

FIG. 3 is a sectional elevation of the barge of FIG. 2 taken along line 3—3 of FIG. 2.

FIG. 4 is another sectional elevation of the barge of FIG. 2 showing a hopper in cross-section.

FIG. 5 is a partial plan view showing typical compressed air piping within a barge to allow balanced unloading, taken generally along line 5—5 of FIG. 3.

FIG. 6 is detailed elevation showing the vacuum piping associated with the collectors for each hopper.

FIG. 7 is a detailed sectional elevation viewed substantially along line 7—7 of FIG. 10.

FIG. 8 is a detailed perspective view of a preferred suction nozzle of this invention.

BEST MODE FOR CARRYING OUT THE INVENTION

A. Introduction

Figure 1:
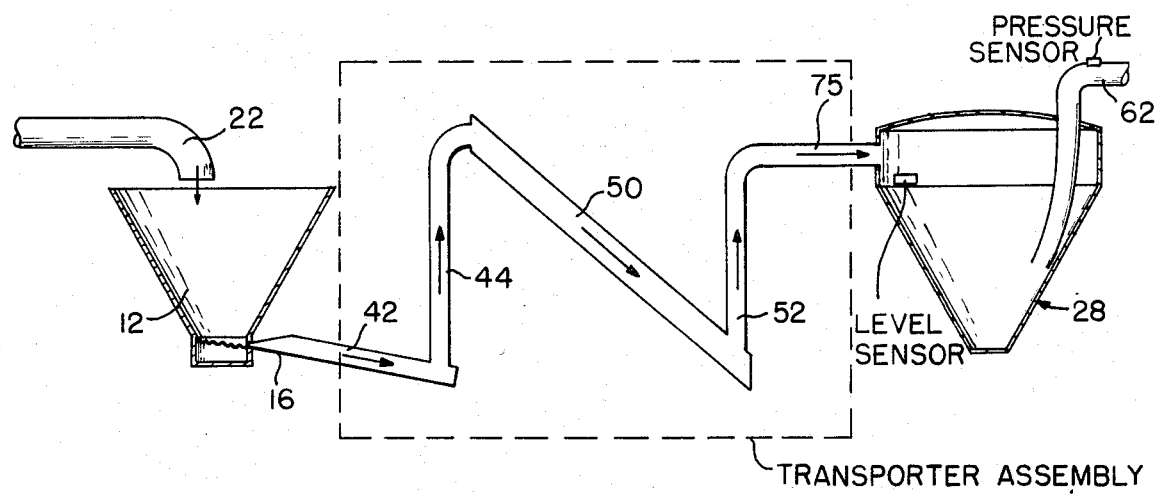
FIG. 1 is a schematic of the system of this invention.

As shown schematically in FIG. 1, a nozzle 16 draws the material from a hopper 12 and deposits the material in a transporter assembly, which conveys the material to a central vacuum-pressure pneumatic conveyor 28. During a discharge cycle, the vacuum-pressure pneumatic conveyor 28 pushes the material from its storage vessel, through a discharge conduit 62 to a suitable receptacle (not shown). The transporter assembly comprises an assortment of substantially horizontal pneumatic conveyors 42, 50, and 75 and vacuum lift tubes 44 and 52.

A "horizontal pneumatic conveyor" is an "Airslide"-type conveyor (FIG. 8) which transports material with air-assisted gravity flow, having a top and bottom section bolted together to hold a porous membrane across the interior of the conveyor. The membrane defines an air chamber (plenum) below the membrane and a fluidized powder compartment above the membrane. Air flowing upwardly through the membrane fluidizes bulk material on the membrane and allows the material to flow by gravity-flow. In each hopper, the top section of each conveyor is removed so that the membrane becomes a portion of the wall of the hopper (FIG. 7).

The preferred transporter assembly is pneumatic and is a combination of vacuum-operated and air-assisted gravity conveyors. Other devices, such as conveyor belts or buckets, might be used, but they are not as desirable due to maintenance problems, life expectancy, or cost.

B. A Preferred System

A self-unloading barge of this invention, then, has a barge hull 10 (FIG. 2) in which a plurality of hoppers 12 are disposed in side-by-side relationship. Generally, three hoppers 12 will be used and will optimally occupy the useful volume of the hull 10. Preferably, each hopper 12 is covered to allow recirculation of air within the pneumatic loading and unloading systems of the barge and, thereby, to reduce the dust problems generally associated with loading and unloading of bulk materials. If a fully pneumatic unloading system is used, each hopper 12 is usually tilted at no greater than an eight degree slope (FIG. 4) to allow gravity flow of the bulk material within each hopper 12 to predetermined points where nozzles 16 collect the material. This tilting allows efficient use of the useful capacity of the barge. The hoppers 12 may be made into the trusswork (FIG. 7) of the barge to provide additional structural integrity for the barge.

Various loading systems may be used to load the hoppers 12, but the preferred loading system (FIG. 2) includes an inlet conduit 18 which branches into main trunk lines 20 that, in turn, branch into branch lines 22 to allow balanced loading of the hoppers 12. Valves 24 are associated with the inlet conduit 18, trunk lines 20, and branch lines 22 to control the loading. A source of compressed air 25 (compressor) provides compressed air for the pneumatic loading system and includes associated filters 26 for dust control. Other loading systems, of course, could be used, such as conveyor belts, buckets, or other conventional transporters for bulk materials (not shown).

To unload the bulk material from the hoppers 12, a collector system is used to transport the material, first, to a central vacuum-pressure pneumatic conveyor 28, and, second, to onshore storage vessels (not shown) by automatic cycling of the vacuum-pressure pneumatic conveyor. Use of a central vacuum-pressure pneumatic conveyor 28 is a major feature of the preferred self-unloading barge of this invention.

As previously described, an open pneumatic conveyor 30 is disposed within each hopper 12 to convey the bulk material to various suction nozzles 16 positioned along the walls of the hoppers 12 at predetermined locations. The conveyors 30 (FIGS. 7 or 8) consist of a porous membrane 34 which forms a portion of the hopper wall. A housing 36 is disposed beneath the membrane 34 to define a chamber 38 for transport of pressurized air below the membrane 34. The pressurized air is forced upwardly through the membrane 34 and through the bulk material above the membrane 34 to fluidize the material in each hopper 12 and to cause it to flow down the sloped conveyor 30 toward the nozzles 16. For Portland cement, a pressure of approximately three psig in the chamber 38 is necessary to provide fluidizing capacity. Preferably, the conveyors 30 in each hopper 12 are slanted at an angle of between about two to ten degrees, and generally are disposed at a five degree angle from the horizontal.

Nozzles 16 (FIGS. 1 or 8) draw the bulk material from the hoppers 12 into the transporter assembly. They are positioned along the hoppers 12 to allow balanced unloading of the bulk material from each hopper 12. Each nozzle 16 is usually sloped downwardly at an angle of between about five to six degrees (with a minimum slope of about three degrees).

The transporter assembly (FIGS. 1 and 7) preferably includes a covered, pressurized, air-assisted gravity conveyor 42 slanted at about a five degree slope and connected to each nozzle 16 to convey the bulk material by gravity flow to associated vacuum lift tubes 44. Each vacuum lift tube 44 is a short-line, substantially vertical, dense-phase conduit which raises the material with vacuum suction. By "vacuum," it is meant that the pressure inside the conveying conduit is less than ambient. Each covered conveyor 42 also includes (FIG. 8) a porous membrane or plenum 46 under which pressurized air is passed to flow upwardly through the plenum 46 and through the bulk material to fluidize it. Preferably, phase separation occurs in the covered conveyor 42. By this, it is meant that an interface develops between the fluidized bulk material and air within the fluidized powder compartment above the plenum 46. That is, the fluidized material does not occupy the entire volume of the covered conveyor 42, but rather occupies only a portion, thereby ensuring relatively dense-phase, low-velocity transport of the bulk material. If phase separation occurs, bulk material on the membrane will be fluidized and will be able to flow by gravity, but a part of the volume of the fluidized powder compartment will be available as a conduit for low-velocity air, which provides the motive force at the lift tubes 44 or nozzles 16.

Use of vacuum lift tubes 44 reduces the power and air volume requirements of the system and allows use of more efficient, smaller, less expensive duplex pumps 48 to power the unloading system. It is easier to rarify air than to compress it, so less work is required and less energy consumed when vacuum suction is used.

The lift tubes 44 deposit the material on the membrane of a central transport conveyor 50, which is commonly a conventional pneumatic conveyor of the "Airslide" type. This central transport conveyor 50 connects with a central vacuum lift tube 52, which lifts the bulk material by short-line, dense-phase flow for passage into one of a tandem of central vaccuum-pressure conveyors 28.

To ensure that balanced loading and unloading of the system are possible, various valves 54 are associated with the compressed air conduit lines 55 (FIG. 5) and vacuum conduit lines 56 (FIG. 6) to promote unloading of the hoppers 12 from predetermined locations. The preferred plumbing is best shown in FIGS. 5 and 6, and will not be described further.

Each vaccuum-pressure pneumatic conveyor 28 includes a storage vessel 58 and a discharge outlet 60. Generally, each will include automatic cycling means to switch between a loading cycle and a discharge cycle. During the loading cycle, bulk material will be lifted into the storage vessel 58 through the central vacuum lift tube 52. During the discharge cycle, compressed air will be forced into the storage vessel 58 to convey the bulk material through a discharge outlet 60 and discharge conduit 62a or 62b (FIGS. 7 or 10) to suitable storage receptacles.

To operate the loading and unloading system, it is essential to have a source of compressed air (compressor) 64 and a source of negative pressure (duplex pump) 48. In some circumstances, the source of negative pressure 48 for the vacuum-pressure pneumatic conveyor 28 may be supplied by a venturi assembly (not shown) associated with the compressor 64. This type of vacuum-pressure pneumatic conveyor system is described with reference to the VACK II pneumatic conveyor formerly sold by the AirKonvey Company and now sold by Premier Pneumatics, Inc. A separate source of negative pressure 48 is generally required to power the vacuum lift tubes 44 and suction nozzles 16, even if venturi assemblies are used for the vacuum-pressure pneumatic conveyors.

All associated bulk material conveying piping is generally conventional piping, but may also be hose, flexible fabric conduit, or other conduit which allows the transport of fluidized bulk material.

Filters 26 and 68 are required to protect the source of compressed air 64 and source of negative pressure 48 from fouling with the bulk material. Usually, Baghouse filters are connected to the conduit lines to eliminate the bulk material before the air enters the pumps or compressors.

Figure 9:
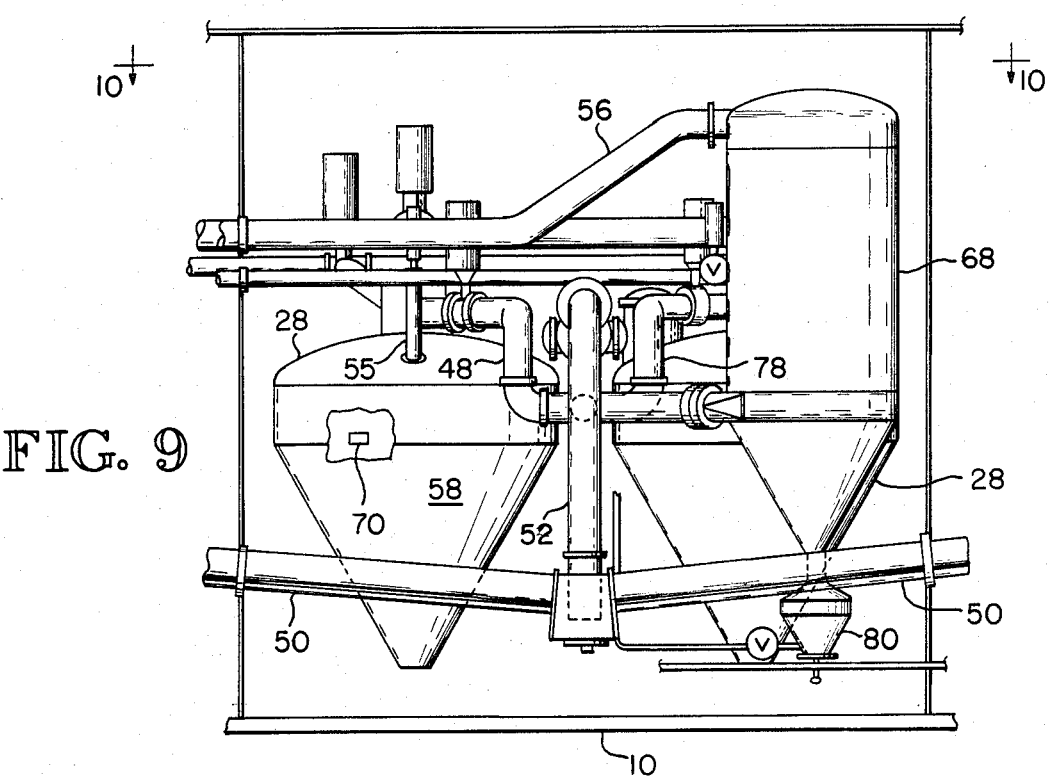
FIG. 9 is a detailed elevation taken generally along line 9—9 of FIG. 10.

To allow automatic switching, the vacuum-pressure pneumatic conveyor 28 generally will include a switching means including a level sensor 70 (FIG. 1 or 9) which is responsive to the level of bulk material within the storage vessel 58 and which switches the vacuum-pressure pneumatic conveyor 28 from a loading cycle to a discharge cycle. Also, the switching means generally includes a pressure sensor 72 (FIG. 1 or 10) which is responsive to the pressure within the discharge conduits 62a or 62b and which switches the vacuum-pressure pneumatic conveyor 28 from the discharge cycle to a loading cycle. If vacuum-pressure pneumatic conveyors 28 are used in tandem (FIGS. 2, 3, and 10), the barge continuously unloads, because one vacuum-pressure pneumatic conveyor 28 is loading while the second is discharging.

To fluidize Portland cement, it is generally necessary to provide a flow of approximately 3-5 scfm/square foot of membrane area through the membrane in the horizontal, air-assisted gravity conveyors. When the air passes through the membrane, it will generally experience a pressure drop of approximately 1 psi.

C. A Detailed Description of the Subsystems

1. The source of compressed air

Ingersoll-Rand screw-type compressors using an 8V92D Detroit turbo diesel engine 74 supply compressed air. Three compressors are generally required, and each compressor provides 1600 inlet cfm at 60 psig, using 310 hp when operating at 190° F. If operated at 45 psig, the power requirement drops down to 245 hp.

2. The source of negative pressure

Duplex pumps provide aeration and vacuum simultaneously. The preferred pumps are M-D-Pneumatics rotary positive blowers Model No. 23070,4, powered by 8V92D engines. At 2100 rpm, each duplex pump delivers 3500 inlet cfm at 15 inches of mercury vacuum under rarified conditions. Each pump consumes 168 hp in providing the vacuum. The other side of the duplex pump delivers 2240 scfm (70° F. at sea level) of air at a pressure of 8 psig. To provide this aeration, the duplex pump consumes 104 hp, bringing the total power required for each duplex pump to 272 hp.

3. The vacuum-pressure pneumatic conveyor

Two 450 cubic foot conical pressure tanks 58 are used in tandem to provide the desired capacity to efficiently unload a bulk material barge. To allow interconnection of the pressure tanks within the hull, covered pneumatic fluidizer conveyors 75 of short span (such as a 12-foot "Airslide" conveyor) are used between the central lift tube 52 and each pressure tank 58. During the loading cycle, material will be fluidized and will travel by vacuum suction in plug flow (i.e., low-velocity, dense-phase, high-pressure drop flow) through the substantially vertical central lift tube 52 onto the membrane of the conveyor 75 and into the loading storage vessel 58. The "User's Manual" for Air-Konvey's VACK II conveyor (Patent rights to the VACK II conveyor are owned by Premier Pneumatics, Inc.) is incorporated by reference into this description, including all photographs and written description of the vacuum-pressure pneumatic conveyor. A more conventional vacuum-pressure pneumatic conveyor, as generally described in U.S. Pat. Nos. 4,168,864; 3,861,830; and 3,372,952 (already incorporated by reference into this description) may also be used.

Figure 10:
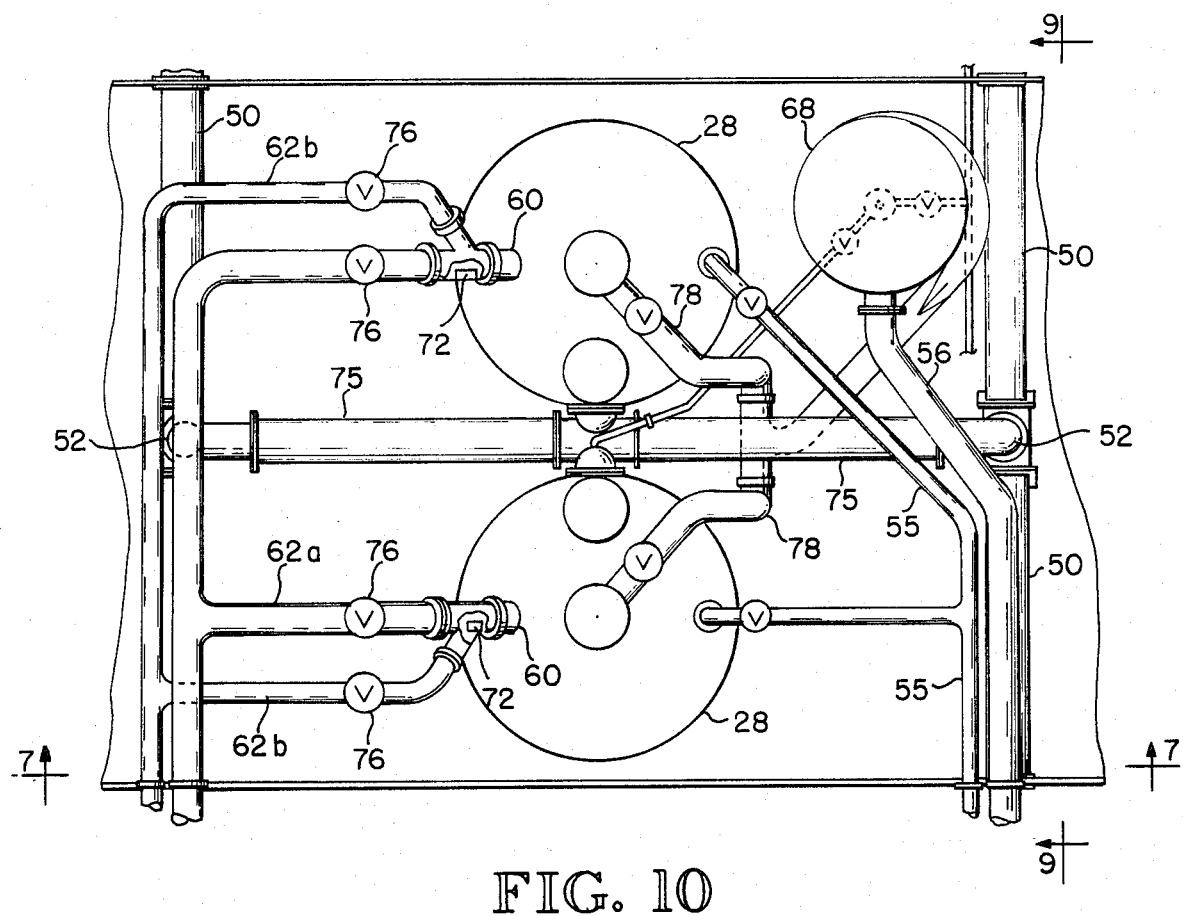
FIG. 10 is a plan view taken generally along line 10—10 of FIG. 9.

As best shown in FIG. 10, two discharge conduits 62a or 62b of different diameter allow the barge to accommodate existing shore facilities and to discharge the bulk material from the vacuum-pressure pneumatic conveyor 28 in dense-phase, plug-flow conveying. Valves 76 are associated with each conduit 62a or 62b to allow switching between the conduits, as desired. A cyclone vacuum filter 68 is associated with the vacuum line 78 that powers the central lift tube 52 to ensure that bulk material is eliminated from the air prior to entry of the air into the duplex vacuum pumps 48. Ordinarily, this filter 68 has a 5-foot diameter and includes a dust hopper 80 (FIG. 9) to collect "knocked-out" bulk material and to allow recycling of the material to the storage vessel 58 of the vacuum-pressure pneumatic conveyor 28. A standard Baghouse filter may be used, instead of a cyclone, to protect the vacuum pumps.

To protect the environment, Baghouse filters 26 are used during loading. Alternate dust collectors which may be used are discussed in the *Chemical Engineers' Handbook*, section 20, entitled "Gas-Solid Systems" (incorporated by reference).

4. The vacuum lift tubes

A Pechiney "Airlift" conveyor ("Airlift" is a registered trademark of Societe L'Aluminium Pechiney) is manufactured by the Halliburton Company and is described at page 24 of the Halliburton brochure entitled "Pneumatic Conveying Systems," SP-11078. This vacuum conveyor may be used. Alternatively, the lift tubes 44 and 52 need only be conduits attached to a source of negative pressure 48 to lift the fluidized bulk material in dense-phase, low-velocity, plug-flow conveying from one pneumatic conveyor to another.

To lift fluidized Portland cement sixteen feet at an apparent velocity of between about 25–30 ft/sec in a substantially vertical conduit, a pressure drop of approximately 7.5 psia will occur. To compensate for the pressure drop in the conduit, the conduit may be tapered to ensure constant velocity transport.

5. The air-assisted gravity conveyors

Either "Airslide" or "Air Trough" conveyors are suitable pneumatic (air-assisted gravity) conveyors to transport the bulk material along the horizontal runs from the suction nozzles 16 to the vacuum-pressure pneumatic conveyor 28. These devices generally include (FIG. 8) a membrane or plenum 46 stretched across a housing 86 to define a plenum chamber 88 between the housing 86 and membrane 46 for transporting compressed air. Compressed air passes through the membrane 46 with a pressure drop of about 1 psi and fluidizes the bulk material to allow gravity flow. Approximately 5 cfm/ft$^2$ of membrane is required to fluidize Portland cement. Preferably, phase separation occurs in the covered section of the conveyor above the plenum.

6. Representative materials

Numerous materials can be conveyed with the pneumatic conveyors of this self-unloading barge system. Essentially any material that may be fluidized can be conveyed, including adipic acid, agline, albacar, alumina, antomite, arsenic, asbestos fibers, barites, bauxite, bentonite, borax, calcium carbonate, calcium chloride, cement, Portland cement, clays, coal, coke, powdered copper, diatomaceous earth, dolomite, feldspar, ferrite powder, fertilizers, flint, flour, fly ash, fluorspar, gilsonite, gypsum (raw or calcined), haydite, hydrol, iron oxide, kaolin, kiln dust, lime, limestone dust, magnesium, magnesite, magnetite, manganese oxide, pebble lime, phosphates, potash, pozzolan, pumice, powdered polyvinyl chloride or PVC monomer, quartz dust, salt cake, sand, shale, expanded shale, soda ash, silica flour, sodium sulfate, starch, strontium carbonate, sugar, syenite, talc, urea, or zinc oxide. These materials and others which may be conveyed are listed in the BHRA Fluid Engineering Pneumotransport 4, Volume 1, of the Fourth International Conference on the Pneumatic Transport of Solids in Pipes, June 26–28, 1978, at pages D3-47 and D3-48 (incorporated by reference).

As shown in FIG. 2 and FIG. 5, the uncovered conveyors 30 in each hopper are forked at the ends (and the hoppers are forked) to use as much of the storage capacity of the hull as possible. The enhanced capacity gained with the pneumatic self-unloading barge system of the present invention will lead to lower prices for the bulk material due to reduced unit transportation costs.

Although described with respect to the preferred embodiment shown in the drawings, the present invention is not limited to this embodiment. This invention should be limited only as is reasonably necessary in light of the claims (which are to be interpreted in light of this description and the pertinent prior art).

I claim:

1. A barge, including a system for unloading cement or another dry, bulk, powdered material from the barge into a predetermined receptable, comprising:
    (a) a barge hull;
    (b) at least one hopper disposed in the hull to receive and to store the material;
    (c) a collector system in the hull to unload the material from the hopper and to convey the material to a vacuum-pressure pneumatic conveyor, including:
        (i) an air-assisted gravity conveyor disposed within each hopper to gather the material to a plurality of predetermined longitudinally spaced points in each hopper;
        (ii) a suction nozzle communicating with each hopper at each predetermined point to unload the material from the hopper by vacuum suction; and (iii) a transporter assembly connected to each nozzle to transport the material from the nozzle to a vacuum-pressure pneumatic conveyor;

wherein the transporter assembly includes:

(i) an air-assisted horizontal gravity conveyor connected to the nozzle to receive the material from the nozzle on a porous membrane defining two chambers, wherein pressurized air is introduced in the conveyor in a first chamber below the membrane and passes through the membrane into the second chamber and through the material on the membrane to fluidize the material so that the material will flow by gravity in the conveyor, yet wherein a vacuum to power the nozzle can be maintained in the second chamber above the material on the membrane; and (ii) a vacuum lift tube connected to the gravity conveyor and communicating with a storage vessel of a vacuum-pressure pneumatic conveyor to lift the material by suction from the gravity conveyor into the storage vessel during a loading cycle.

(d) a vacuum-pressure pneumatic conveyor having:
(i) a storage vessel; and
(ii) a discharge outlet; wherein the vacuum-pressure pneumatic conveyor is disposed in the hull, is connected with the collector system, and alternately fills its storage vessel with the material in the collector during a loading cycle and discharges the material from the storage vessel through the discharge outlet during a discharge cycle;

(e) a discharge conduit connected to the discharge outlet for conveying the material from the discharge outlet to the receptacle during the discharge cycle;

(f) a source of compressed air in the hull to power the pneumatic conveyor during the discharge cycle; and (g) a source of negative pressure in the hull to power the pneumatic conveyor during the loading cycle.

2. The barge of claim 1, further comprising a loader system for conveying the material into the hopper.

3. The barge of claim 2 wherein the loader system is pneumatic and wherein the source of compressed air powers the loader system, the collector system, and the vacuum-pressure pneumatic conveyor.

4. The barge of claim 1 wherein the vacuum lift tube is a substantially vertical, short-line, dense-phase, vacuum lift tube.

5. The barge of claim 4 wherein the lift tube is tapered to provide a substantially constant-velocity lifting of the material.

6. The barge of claim 5 wherein the material has an apparent velocity of between about 25 and 30 ft/sec (7.6 to 9.1 m/sec) in the vacuum lift tube.

7. The barge of claim 1 wherein the vacuum-pressure pneumatic conveyor includes switching means to switch the vacuum-pressure pneumatic conveyor automatically between the loading cycle and the discharge cycle at predetermined intervals.

8. The barge of claim 1 wherein the vacuum-pressure pneumatic conveyor includes switching means having:

(a) a level sensor responsive to the level of the material in the storage vessel and capable of switching the vacuum-pressure pneumatic conveyor from the loading cycle to the discharge cycle when a predetermined level of the material is reached in the storage vessel; and (b) a pressure sensor responsive to the pressure in the storage vessel and capable of switching the vacuum-pressure pneumatic conveyor from the discharge cycle to the loading cycle when a predetermined pressure is reached in the storage vessel.

9. The barge of claim 1 wherein each hopper is covered and wherein makeup air for the source of compressed air is drawn from each hopper, thereby providing a closed-loop air circulation system for the self-unloading barge.

10. A barge, including a system for unloading cement or another dry, bulk, powdered material from the barge into a predetermined receptacle, comprising:

(a) a barge hull;
(b) at least one hopper disposed in the hull to receive and to store the material;
(c) a collector system in the hull to unload the material from the hopper and to transport the material to a vacuum-pressure pneumatic conveyor, including:

(i) an uncovered, air-assisted gravity conveyor disposed within the hopper to gather the material to a plurality of predetermined longitudinally spaced points in the hopper;

(ii) a suction nozzle communicating with each hopper at each predetermined point to unload the material from the hopper by vacuum suction;

(iii) a second air-assisted gravity conveyor connected to each nozzle outside the hopper to receive the material from the nozzle on a porous membrane wherein pressurized air is introduced in the conveyor below the membrane in a first chamber and passes through the material and the membrane into a second chamber to fluidize the material so that the material will flow substantially horizontally by gravity in the conveyor, yet wherein a vacuum to power the nozzle can be maintained in the second chamber above the material on the membrane; and (iv) at least one vacuum lift tube connected to each second gravity conveyor and communicating with a storage vessel of a vacuum-pressure pneumatic conveyor to lift the material from each second gravity conveyor into a storage vessel of the vacuum-pressure pneumatic conveyor during a loading cycle;

(d) a vacuum-pressure pneumatic conveyor having:
(i) a storage vessel; and
(ii) a discharge outlet; wherein the vacuum-pressure pneumatic conveyor is centrally disposed in the hull, is connected to the lift tube of the collector system, and alternately fills its storage vessel with the material in the lift tube during a loading cycle and discharges the material from the storage vessel through the discharge outlet during a discharge cycle;

(e) a discharge conduit connected to the discharge outlet for conveying the material from the vacuum-pressure pneumatic conveyor to the receptacle during the discharge cycle;

(f) a source of compressed air in the hull to power:
(i) the gravity conveyor in the hopper;
(ii) the second gravity conveyors of the collector system; and (iii) the vacuum-pressure pneumatic conveyor during the discharge cycle; and (g) a vacuum source in the hull to power each suction nozzle and the lift tube.

11. The barge of claim 10, further comprising a pneumatic loader system for conveying the material into the hopper wherein the pneumatic loader system is powered from the source of compressed air.

12. The barge of claim 11, further comprising at least one filter within a conduit between the vacuum source and the nozzles and the lift tube to protect the vacuum source against fouling with the material.

13. The barge of claim 10 wherein the vacuum-pressure pneumatic conveyor includes switching means to switch the vacuum-pressure pneumatic conveyor automatically between the loading cycle and the discharge cycle at predetermined intervals.

14. The barge of claim 10 wherein the vacuum-pressure pneumatic conveyor includes switching means having:

(a) a level sensor responsive to the level of the material in the storage vessel and capable of switching the vacuum-pressure pneumatic conveyor from the loading cycle to the discharge cycle when a predetermined level of the material is reached in the storage vessel; and (b) a pressure sensor responsive to the pressure in the storage vessel and capable of switching the vacuum-pressure pneumatic conveyor from the discharge cycle to the loading cycle when a predetermined pressure is reached in the storage vessel.

15. A barge, including a system for pneumatic unloading of cement or another dry, bulk, powdered material from the barge into a receptacle, comprising:

(a) a barge hull;

(b) a plurality of hoppers disposed in side-by-side relationship in the hull to receive and to store the material;

(c) a collector system for each hopper to unload the material from the hopper and to convey the material to a vacuum-pressure pneumatic conveyor, including:

(i) an air-assisted gravity conveyor disposed within each hopper to gather the material in each hopper to a plurality of predetermined longitudinally spaced points within each hopper;

(ii) a suction nozzle communicating with each hopper at each predetermined point to unload the material from the hopper by vacuum suction; and (iii) a transporter assembly connected to each nozzle outside the hopper to transport the material within the hull from the nozzle to a vacuum-pressure pneumatic conveyor, the transporter assembly including:

an air-assisted gravity conveyor connected with each nozzle to receive the material from the nozzle on a porous membrane defining two chambers, wherein pressurized air is introduced in the conveyor below the membrane in one chamber and passes through the membrane into the second chamber and through the material on the membrane to fluidize the material so that the material will flow substantially horizontally by gravity in the conveyor, yet wherein a vacuum to power the nozzle can be maintained in the second chamber above the material on the membrane;

at least one vacuum lift tube connected to each gravity conveyor of the transporter assembly to lift the material by vacuum suction from the associated gravity conveyor to a central transport conveyor; and at least one central transport conveyor to receive the material from each vacuum lift tube and to transport the material to a vacuum-pressure pneumatic conveyor;

(d) a vacuum-pressure pneumatic conveyor having:

(i) a storage vessel; and (ii) a discharge outlet;

wherein the vacuum-pressure pneumatic conveyor is disposed centrally in the hull between hoppers, is connected with the transporter assembly, and alternately fills its storage vessel with the material during a loading cycle and discharges the material from the storage vessel through the discharge outlet during a discharge cycle;

(e) a discharge conduit connected to the discharge outlet of the vacuum-pressure pneumatic conveyor for conveying the material from the vacuum-pressure pneumatic conveyor to the receptacle during the discharge cycle;

(f) a source of compressed air in the hull to power the collector system and the vacuum-pressure pneumatic conveyor; and (g) a vacuum source in the hull to power the nozzles and vacuum-pressure pneumatic conveyor.

16. The barge of claim 15 wherein the collector system further includes means for balanced unloading of the barge including means for powering each nozzle and each associated transporter assembly independently.

17. The barge of claim 15, further comprising a pneumatic loader system for conveying the material into each hopper, including means for balanced loading of the barge having:

(a) an inlet conduit extending into the hull and communicating with a source of compressed air for pneumatic conveying of the material;

(b) at least one trunk line forking from the inlet conduit and extending to each hopper;

(c) branch lines extending from each trunk line at predetermined spaced positions along the length of each hopper to carry the material from the trunk line into the hopper; and (d) valves associated with each trunk line and the branch lines to control the flow of air and material through the respective branch lines and trunk line to allow balanced loading of each hopper and, subsequently, balanced loading of the barge.

18. The barge of claim 15 wherein the central transport conveyor includes:

(a) at least one central, air-assisted gravity conveyor to receive the material from each vacuum lift tube on a porous membrane and to convey the material substantially horizontally by gravity to a central vacuum lift tube, wherein pressurized air is introduced below the membrane in a chamber and passes through the membrane and the material on the membrane into a second chamber to fluidize the material so that the material will flow by gravity in the second chamber; and (b) at least one central vacuum lift tube connected to each central gravity conveyor of the central transport conveyor and communicating with the storage vessel of the vacuum-pressure pneumatic conveyor to lift the material by vacuum suction from each such conveyor into the storage vessel during the loading cycle of the vacuum-pressure pneumatic conveyor.

19. The barge of claim 18, further comprising:
    (a) at least one compressed air conduit connected to the source of compressed air and extending to each air-assisted gravity conveyor of the transporter assembly to power each conveyor; and
    (b) valves associated with the compressed air conduit to control the flow of compressed air to predetermined combinations of the conveyors, thereby allowing balanced unloading of the material from the hoppers.

20. The barge of claim 15 wherein the hoppers are arranged to form portions of a trusswork for the barge to add strength and stability to the barge.

21. A barge, including a system for pneumatic loading and unloading of cement or another dry, bulk, powdered material from a receptacle and capable of balanced loading and unloading of the material, comprising:
    (a) a barge hull;
    (b) a plurality of hoppers disposed side-by-side in the hull to receive and to store the material;
    (c) a pneumatic loader system for conveying the material into each hopper capable of balanced loading of the barge, including:
        (i) an inlet conduit extending into the hull, capable of collecting the material and capable of conveying the material into the barge;
        (ii) a source of pneumatic power to power the inlet conduit, connected to the inlet conduit;
        (iii) at least one trunk line forking from the inlet conduit, powered by the source of pneumatic power to convey the material to the hoppers in the barge, at least one trunk line extending substantially along the length of each hopper;
        (iv) branch lines extending from each trunk line at predetermined positions along the trunk line above each hopper to carry the material from the trunk line into the associated hopper; and
        (v) valves associated with each trunk line and the branch lines to control the flow of air and the material through the respective trunk line and branch lines, thereby allowing balanced loading of each hopper and, subsequently, balanced loading of the barge;
    (d) a collector system in the hull to unload the material from each hopper and to convey the material to a vacuum-pressure pneumatic conveyor, including:
        (i) an uncovered, air-assisted gravity conveyor disposed within each hopper to collect the material in each hopper to a plurality of predetermined longitudinally spaced points within each hopper, wherein each such conveyor includes:
        a housing; and
        a porous membrane forming a portion of the hopper and defining a chamber between the housing and the membrane through which compressed air is capable of flowing;
        and wherein compressed air flows through the chamber, passes upwardly through the membrane, into the hopper, and passes through at least a portion of the material in the hopper to fluidize that portion of the material so that the material will flow substantially horizontally by gravity along the conveyor to a predetermined point;
        (ii) a suction nozzle communicating with a hopper at each predetermined point to unload the material collected at the predetermined point from the hopper by vacuum suction;
        (iii) an air-assisted gravity conveyor connected with each nozzle outside the hopper to receive the material from the nozzle on a porous membrane, wherein pressurized air is introduced in the conveyor in a first chamber below the membrane and passes through the membrane into a second chamber to fluidize the material so that the material will flow substantially horizontally by gravity in the conveyor, yet wherein a vacuum to power the nozzle can be maintained in the second chamber above the material on the membrane; and
        (iv) a vacuum lift tube connected to each gravity conveyor to lift the material by vacuum suction from each such gravity conveyor to a central pneumatic conveyor;
        (v) at least one air-assisted, gravity, central pneumatic conveyor to receive the material from each lift tube on a porous membrane and to convey the material substantially horizontally to a central lift tube, wherein pressurized air is introduced below the membrane and passes through the membrane and through the material on the membrane to fluidize the material on the membrane so that the material will flow substantially horizontally by gravity in each central pneumatic conveyor;
        (vi) at least one central lift tube connected to the central pneumatic conveyors and communicating with a storage vessel of a vacuum-pressure pneumatic conveyor to lift the material by vacuum suction from the central pneumatic conveyors into the vacuum-pressure pneumatic conveyor during a loading cycle;
        (vii) a source of compressed air in the hull;
        (viii) a compressed air conduit connected to the source of compressed air and extending in the hull to:
        the chamber of the conveyor within each hopper;
        each gravity conveyor; and
        each central pneumatic conveyor to power these conveyors with compressed air; and
        (ix) valves associated with the comrpessed air conduit to control flow of compressed air to predetermined combinations of the conveyors, thereby allowing balanced unloading of the material from the hoppers;
    (e) at least one vacuum-pressure pneumatic conveyor having:
        (i) a storage vessel; and
        (ii) a discharge outlet;
    wherein each vacuum-pressure pneumatic conveyor is centrally disposed in the hull between hoppers, is connected with each central lift tube, and alternately fills its storage vessel with the material during a loading cycle and discharges the material from the storage vessel through the discharge outlet during a discharge cycle;
    (f) a discharge conduit in the hull connected to the discharge outlet of each vacuum-pressure pneumatic conveyor for conveying the material from the vacuum-pressure pneumatic conveyor to the receptacle during the discharge cycle;

(g) a source of compressed air in the hull to power the vacuum-pressure pneumatic conveyor during the discharge cycle; and (h) a vacuum source in the hull to create vacuum suction in each nozzle, each vacuum lift tube, and each central vacuum lift tube during the loading cycle.

22. The barge of claim 21 wherein the vacuum source pulls a vacuum in progressive fashion through the storage vessel of the vacuum-pressure pneumatic conveyor, through each central lift tube, through each central pneumatic conveyor, through each associated vacuum lift tube, through each associated gravity conveyor, and, finally, through each associated nozzle.

23. The barge of claim 21 wherein the vacuum-pressure pneumatic conveyor further has switching means to switch the vacuum-pressure pneumatic conveyor automatically between the loading cycle and the discharge cycle at predetermined intervals.

24. The barge of claim 25 wherein the switching means includes:
(a) a level sensor responsive to the level of the material in the storage vessel and capable of switching the vacuum-pressure pneumatic conveyor from the loading cycle to the discharge cycle when a predetermined level of the material is reached in the storage vessel; and
(b) a pressure sensor responsive to the pressure in the storage vessel and capable of switching the vacuum-pressure pneumatic conveyor from the discharge cycle to the loading cycle when a predetermined pressure is reached in the storage vessel.

25. The barge of claim 21 wherein each hopper is covered and wherein makeup air for the source of compressed air is drawn from each hopper, thereby providing a closed-loop air circulation system for the self-unloading barge.

* * * * *